Nov. 10, 1925.
G. R. SPERL
1,561,034
ADJUSTABLE ANTIGLARE SHIELD
Filed May 14, 1925
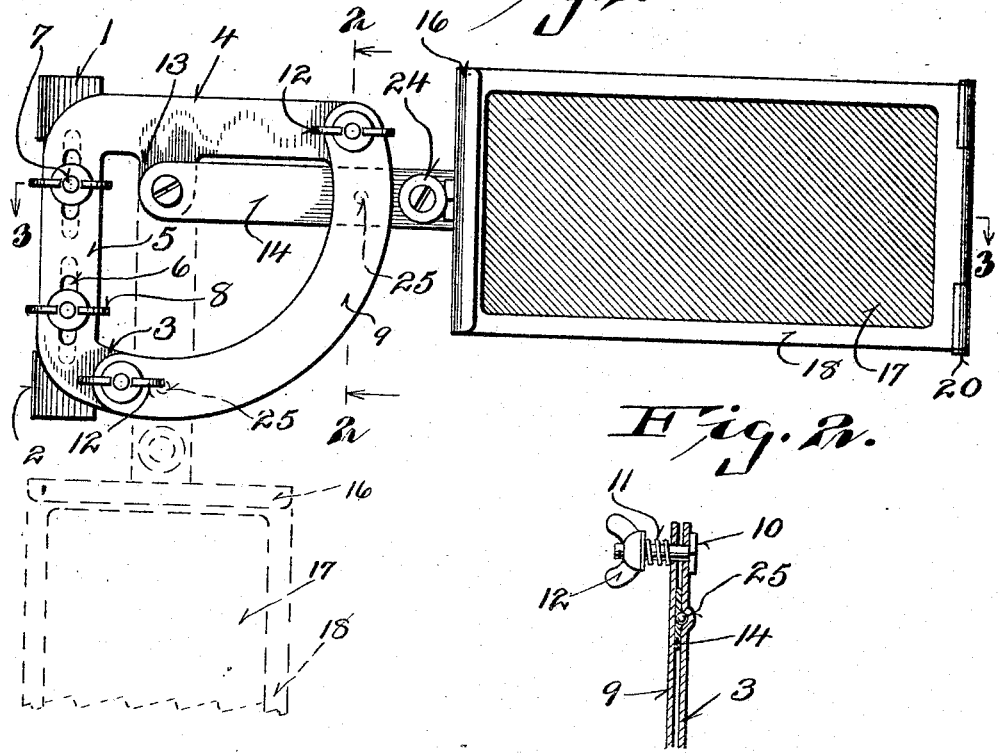
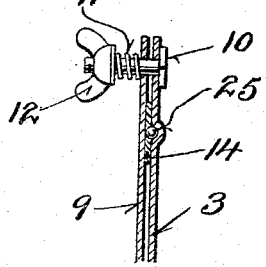
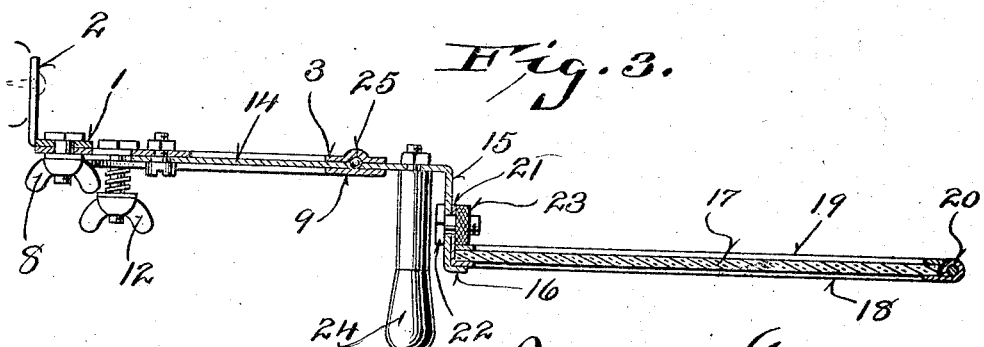
Inventor
Gustav R. Sperl Patented Nov. 10, 1925.

1,561,034

UNITED STATES PATENT OFFICE.

GUSTAV R. SPERL, OF MILWAUKEE, WISCONSIN.

ADJUSTABLE ANTIGLARE SHIELD.

Application filed May 14, 1925. Serial No. 30,259.

*To all whom it may concern:*

Be it known that I, GUSTAV R. SPERL, a citizen of the United States, and resident of Milwaukee, in the county of Milwaukee and State of Wisconsin, have invented certain new and useful Improvements in Adjustable Antiglare Shields; and I do hereby declare that the following is a full, clear, and exact description thereof.

This invention relates to adjustable antiglare shields.

Objects of this invention are to provide anti-glare shields which may be attached to the wind shield of an open car or to the frame work of a closed car, which may be quickly swung to the desired position for shielding the driver's eyes, which is automatically retained in such position, and which may be swung out of its shielding position and retained in its inoperative position.

Further objects are to provide a simple type of shield retaining means which will provide the requisite frictional resistance to hold the shield in adjusted position, which will yield when the driver operates the shield, and in which the exact tension desired may be easily secured.

Further objects are to provide an anti-glare shield in which the shielding plate is removably held in position, and in which an interchange of shielding plates may be easily effected in a simple manner.

An embodiment of the invention is shown in the accompanying drawings, in which:—

Figure 1 is a view of the device showing the shield in its operative position in full lines and showing it in inoperative position in dotted lines.

Figure 2 is a sectional view on the line 2—2 of Figure 1.

Figure 3 is a sectional view on the line 3—3 of Figure 1.

Referring to the drawings, it will be seen that a clip 1 is provided with an angular extension 2, whereby it may be secured to a suitable support. A sector shaped member 3 is provided with a pair of right angle arms 4 and 5. One of these arms, for instance, the arm 5, is positioned in contact with the clip 1, and the clip 1 and such arm are provided with elongated slots 6 through which bolts 7 pass, such bolts being provided with wing nuts 8.

An arcuate strip 9 is positioned adjacent the curved portion 3 of the bracket, as shown most clearly in Figures 2 and 3, and the outer ends of such curved portion and of the arcuate strip are provided with apertures through which bolts 10 pass. These bolts carry helical springs 11 and wing nuts 12, whereby the tension of the springs may be adjusted.

The bracket is provided with a depending arm 13 to which a swinging arm 14 is pivotally attached. This swinging arm 14 is provided with an angularly turned portion 15 which terminates in an outwardly turned flange 16, as shown in Figures 1 and 3.

An anti-glare shield 17 of suitably colored transparent material is provided and is preferably of rectangular contour. This shield is held between a pair of pivoted border members 18 and 19, such members being joined by a pintle pin 20 at their outer ends. One of such members, for instance, the member 18 is provided with an angularly turned portion 21 which contacts with the angular portion 15 of the arm 14, as shown in Figure 3. A bolt 22 is passed through such portions and a knurled nut 23 is screwed upon the bolt. This knurled nut bears against the free end of the member 19 and retains such member in its proper relation to the member 18. Obviously, the members 18 and 19 may be provided with marginal flanges to aid in retaining the shield 17 in place. The arm 14 is provided with a manipulating handle 24 which projects outwardly towards the driver.

It is to be noted from reference to Figures 2 and 3 that the arm 14 is positioned between the members 3 and 9 and is thus frictionally held thereby. It is preferable to provide the arm 14 and one of the members, such as the member 3, with interengaging members 25 (see Figures 2 and 3). These members may consist of a projection formed on the arm and recesses formed on the member 3. Preferably at least two of these recesses are provided in the member 3, as shown in Figure 1, one of such recesses being formed in the upper portion and one in the lower portion so as to securely retain the arm frictionally in either its upper or its lower position. It is apparent that additional depressions may be formed between these outermost depressions if desired.

In using the device, the initial adjustment of the bracket is secured by loosening the wing nuts 8 and sliding the bracket up or down as desired. Thereafter, the wing nuts 8 are tightened. When the driver desires to use the anti-glare shield, it is merely necessary for him to grip the handle 24 and quickly swing the shield into position, such shield being held in this position by the interengaging members, such members readily separating and permitting this operation.

It will be seen that an anti-glare shield has been provided which is of extremely simple construction, which may be instantly swung into operative position, and which is automatically retained in either its operative or inoperative position by the interengaging members.

Although the invention has been described in considerable detail, it is to be understood that the invention may be variously embodied and is, therefore, to be limited only as claimed.

I claim:

An anti-glare device for automobiles comprising an attaching clip, a bracket adjustably secured to said clip and having an arcuate portion, an arm pivoted to said bracket and adapted to swing over said arcuate portion, a second arcuate member positioned in front of said arm and clamping said arm against said first arcuate portion, and springs for urging said arcuate portions towards each other, said arm having a manipulating handle and an anti-glare shield carried by the outer end of said arm.

In testimony that I claim the foregoing I have hereunto set my hand at Milwaukee, in the county of Milwaukee and State of Wisconsin.

GUSTAV R. SPERL.